W. F. GOESSLING, H. E. PAUK, C. M. KACHEL & O. A. HECKEL.
CLOTH MEASURING AND PRICE COMPUTING MACHINE.
APPLICATION FILED OCT. 11, 1909.

1,032,538.

Patented July 16, 1912.

10 SHEETS—SHEET 3.

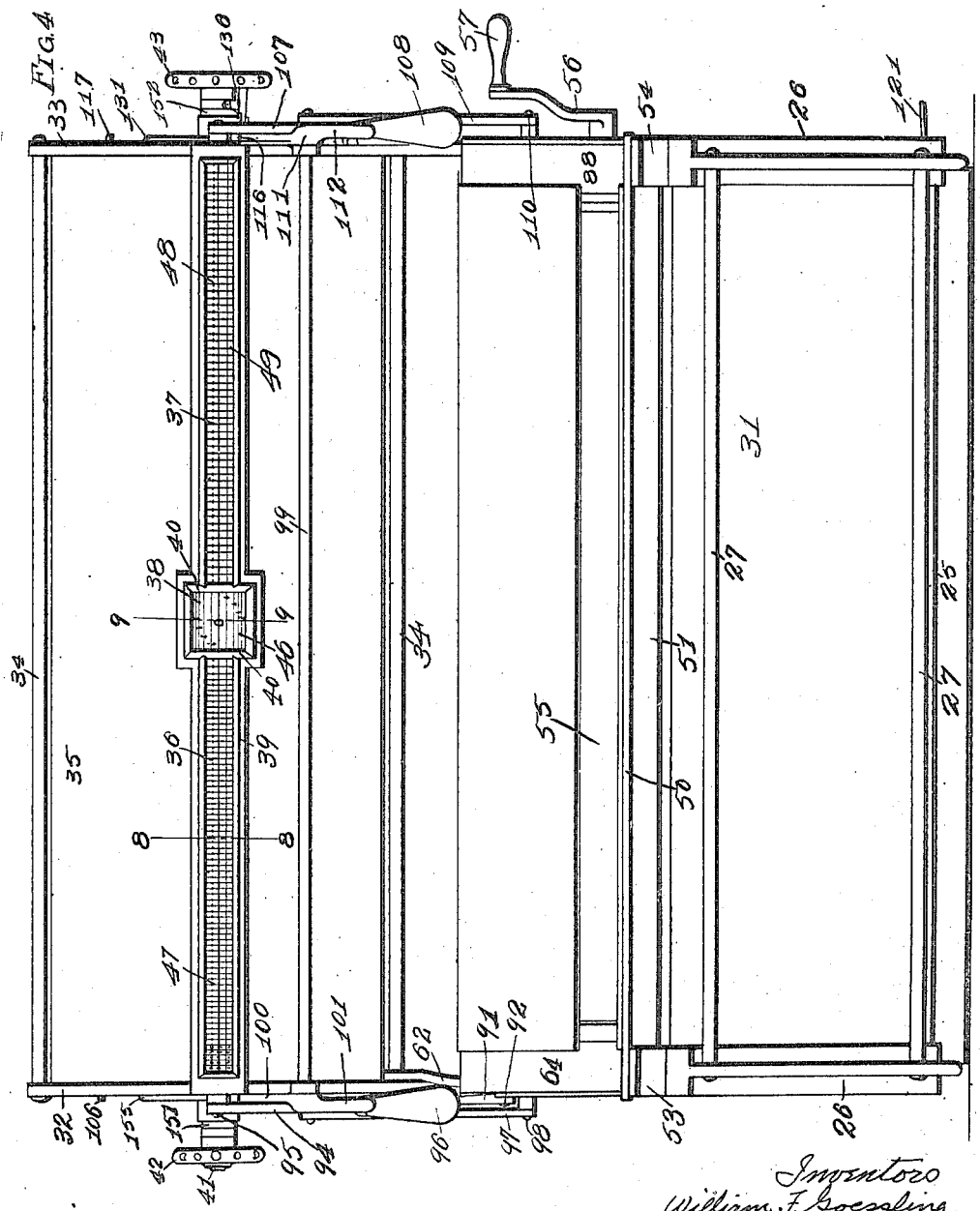

W. F. GOESSLING, H. E. PAUK, C. M. KACHEL & O. A. HECKEL.
CLOTH MEASURING AND PRICE COMPUTING MACHINE.
APPLICATION FILED OCT. 11, 1909.
1,032,538.
Patented July 16, 1912.
10 SHEETS—SHEET 5.
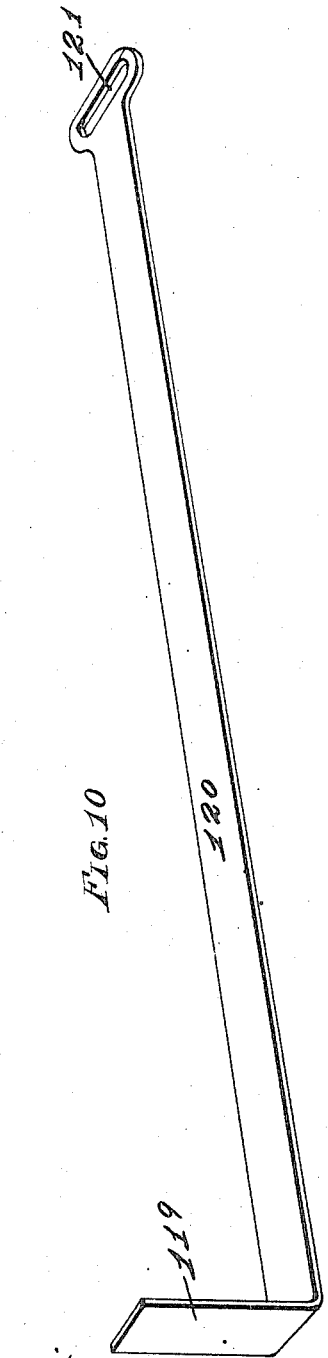
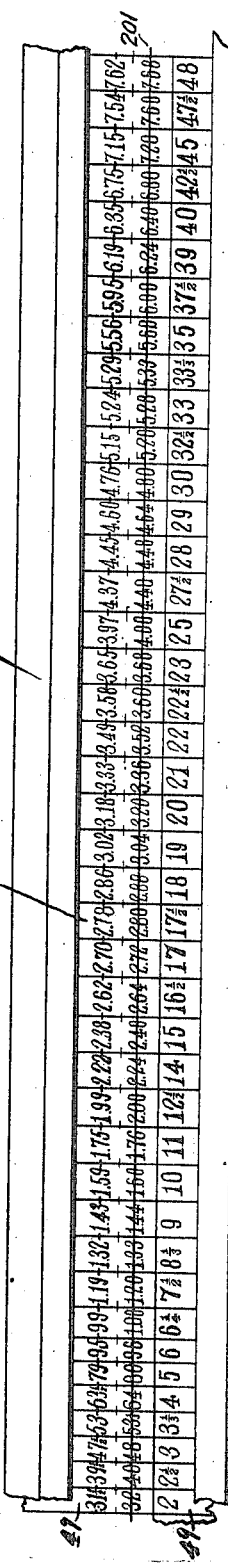
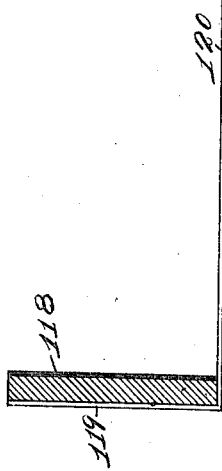

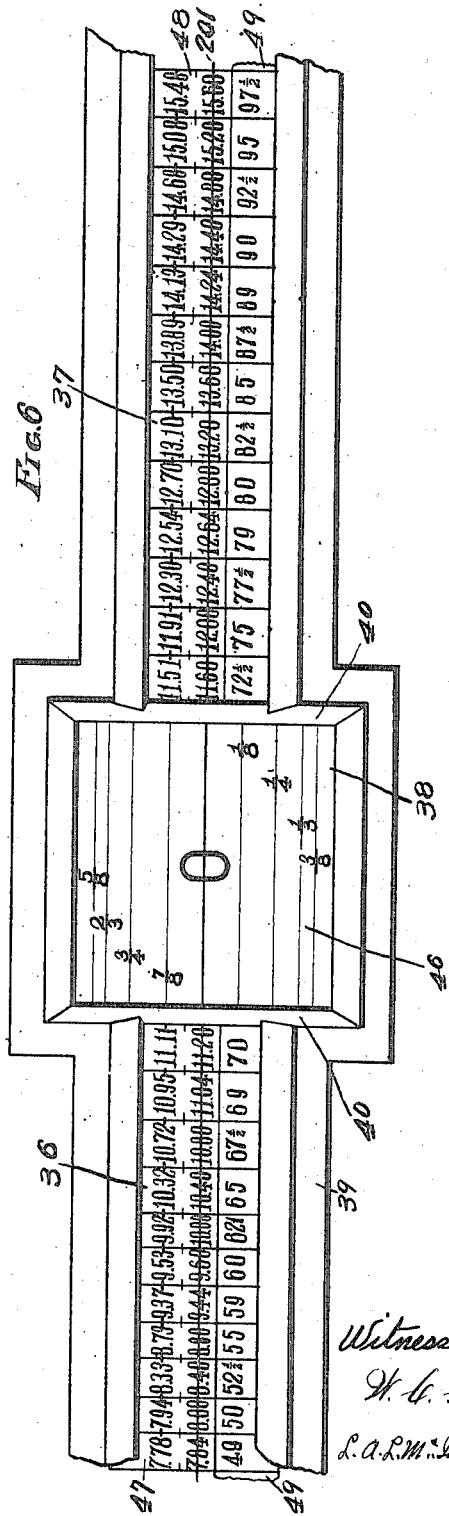
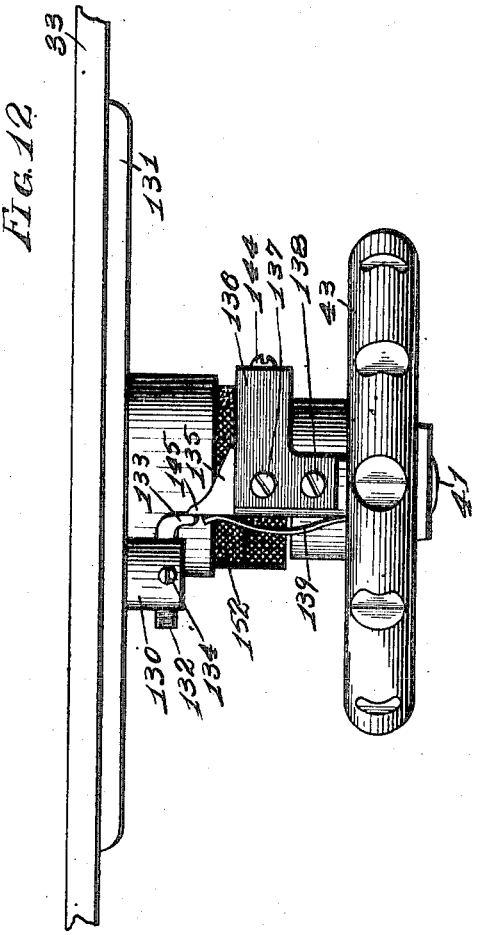

W. F. GOESSLING, H. E. PAUK, C. M. KACHEL & O. A. HECKEL.
CLOTH MEASURING AND PRICE COMPUTING MACHINE.
APPLICATION FILED OCT. 11, 1909.
1,032,538.
Patented July 16, 1912.
10 SHEETS—SHEET 7.
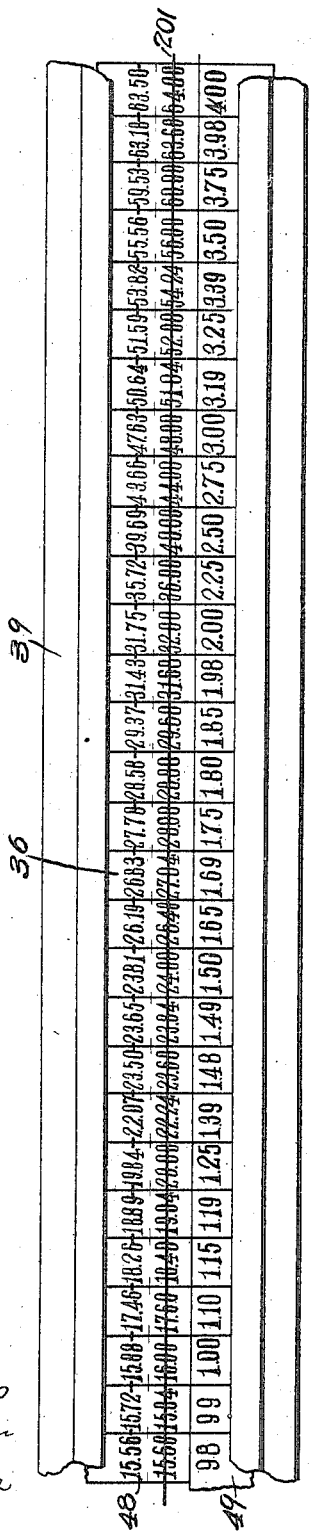
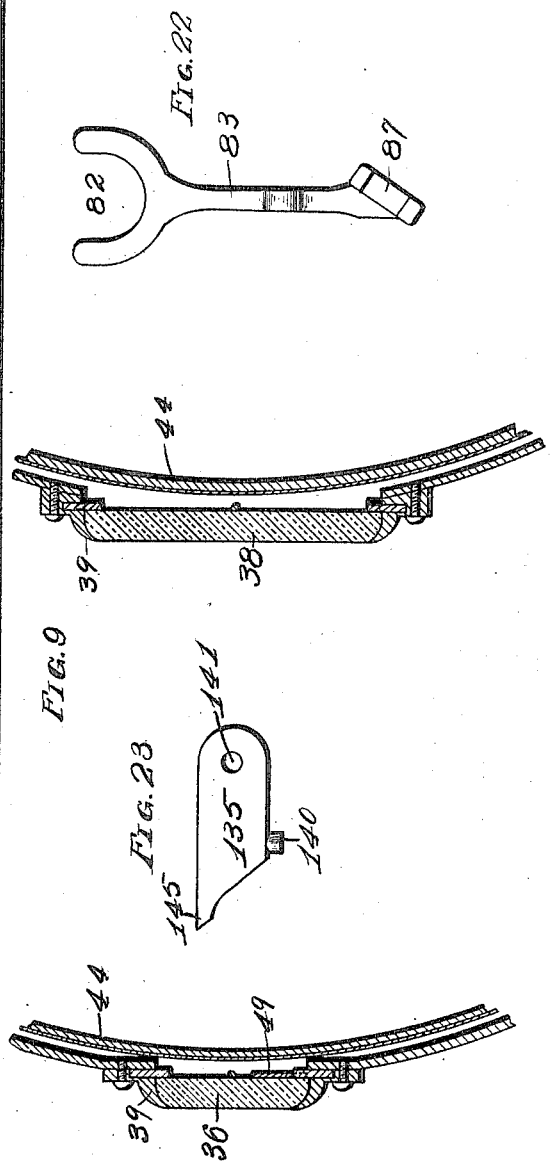
Witnesses
W. C. Stein
L. A. L. McIntyre
Inventors
William F. Goessling
Henry E. Pauk
Charles M. Kachel
Otto A. Heckel
by Hopkins & Eicks Attys

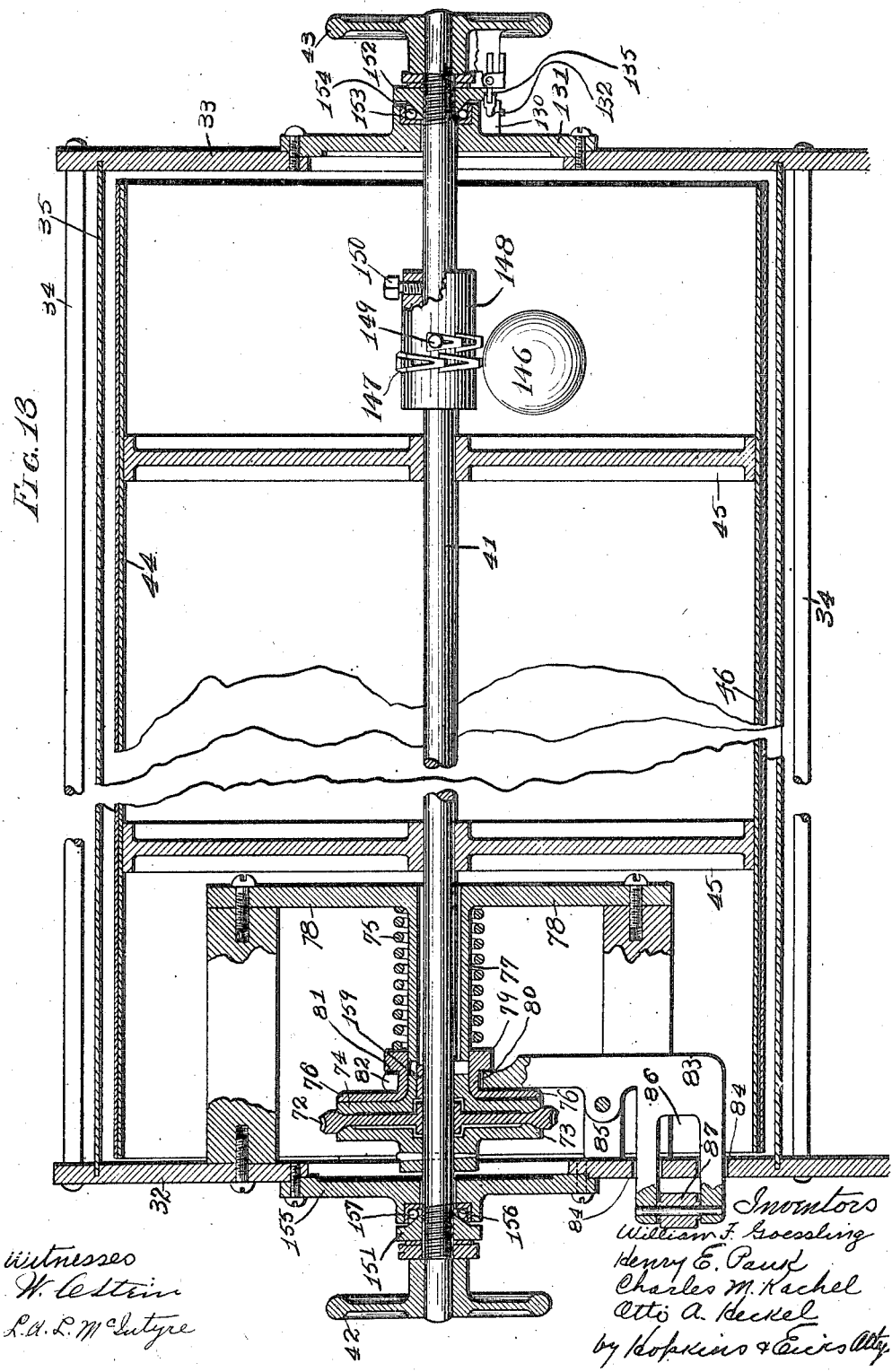

W. F. GOESSLING, H. E. PAUK, C. M. KACHEL & O. A. HECKEL.
CLOTH MEASURING AND PRICE COMPUTING MACHINE.
APPLICATION FILED OCT. 11, 1909.

1,032,538.

Patented July 16, 1912.
10 SHEETS—SHEET 9.

Witnesses
W. Cestein
L. A. L. McIntyre

Inventors
William F. Goessling
Henry E. Pauk
Charles M. Kachel
Otto A. Heckel
by Hopkins & Ticks Attys

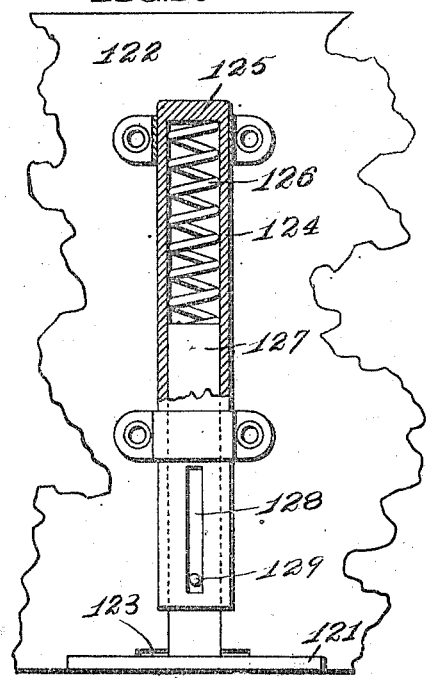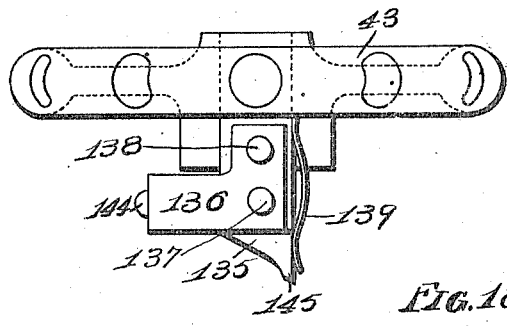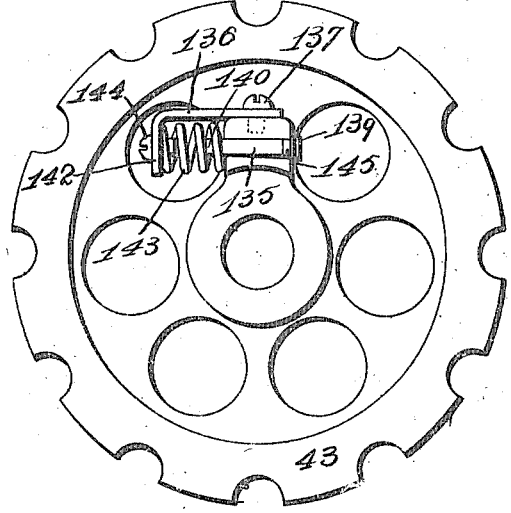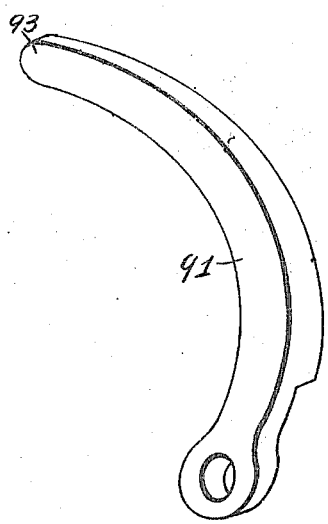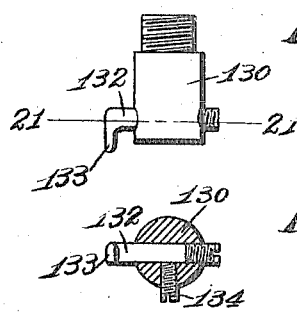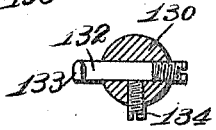

UNITED STATES PATENT OFFICE.

WILLIAM F. GOESSLING, HENRY E. PAUK, CHARLES M. KACHEL, AND OTTO A. HECKEL, OF ST. LOUIS, MISSOURI, ASSIGNORS TO CLOTHMETER MANUFACTURING COMPANY, A CORPORATION OF MISSOURI.

CLOTH-MEASURING AND PRICE-COMPUTING MACHINE.

1,032,538.      Specification of Letters Patent.      Patented July 16, 1912.

Application filed October 11, 1909. Serial No. 522,003.

*To all whom it may concern:*

Be it known that we, WILLIAM F. GOESSLING, HENRY E. PAUK, CHARLES M. KACHEL, and OTTO A. HECKEL, citizens of the United States, and residents of St. Louis, Missouri, have invented certain new and useful Improvements in Cloth-Measuring and Price-Computing Machines, of which the following is a specification.

Our invention relates to improvements in cloth-measuring and price-computing machines, and relates more particularly to that type of said machines in which a computing drum is actuated by the unwinding of cloth from the bolt.

Figure 1:
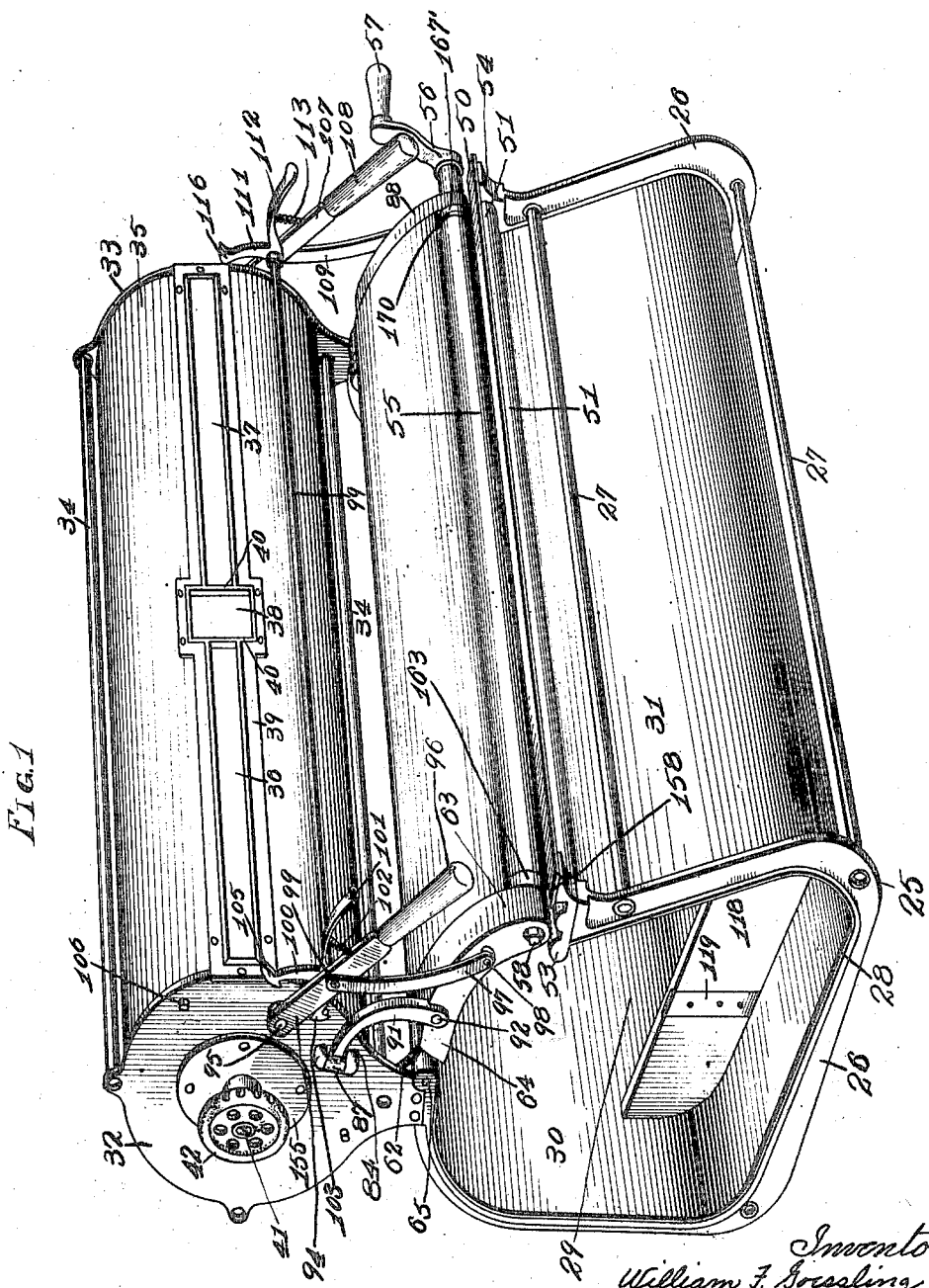
Figure 2:
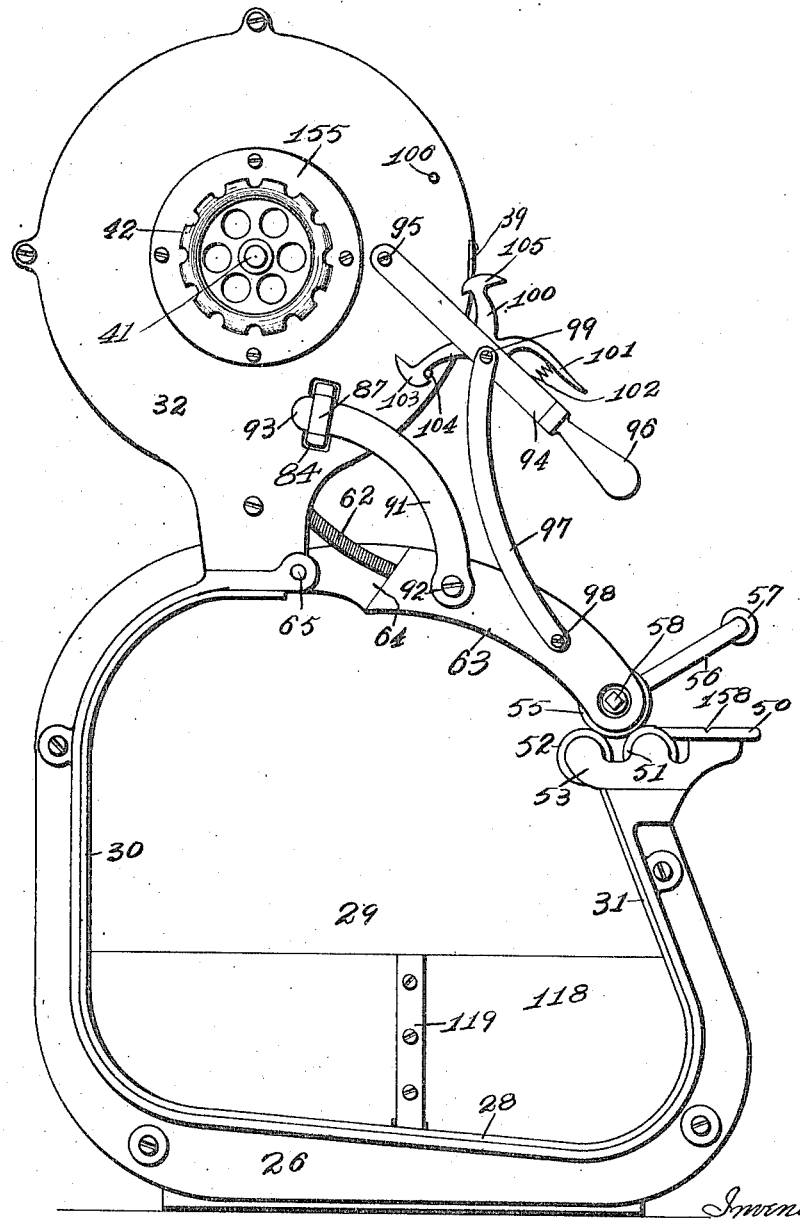
Figure 3:
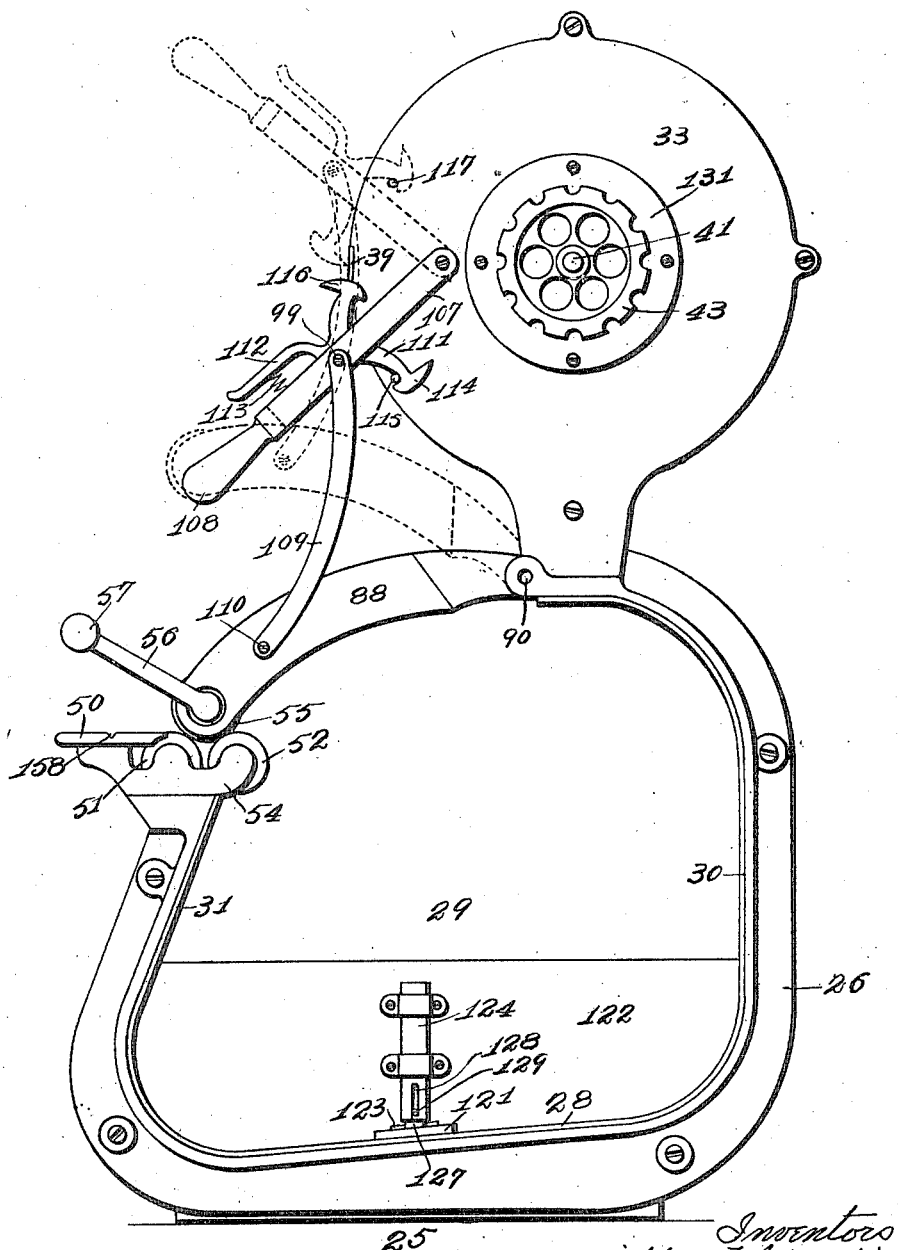
Figure 14:
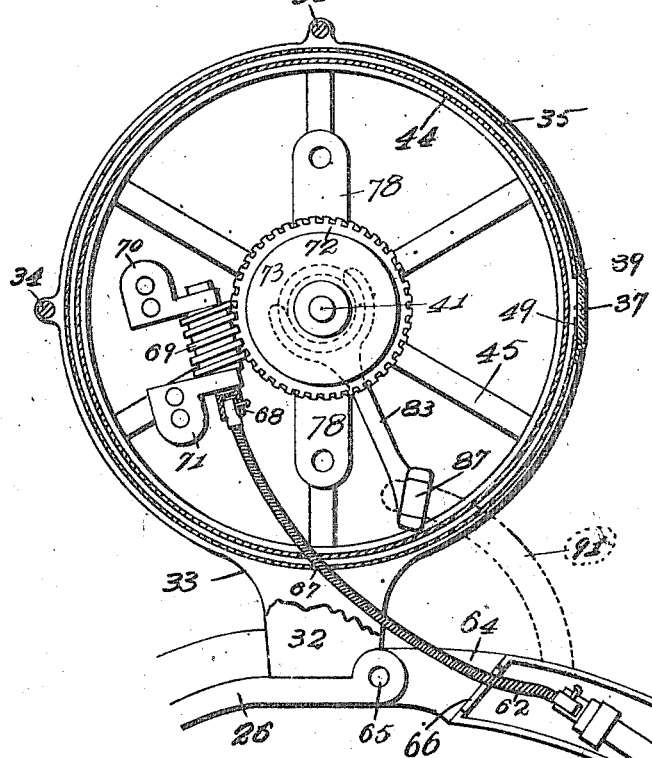
Figure 15:
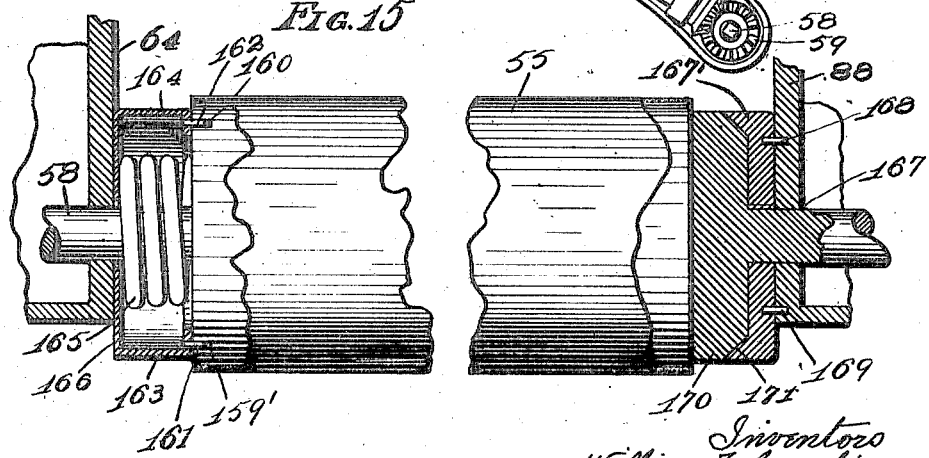

In the drawings—Figure 1 is a perspective view of a device embodying our invention. Fig. 2 is a side elevation of the same. Fig. 3 is an elevation of the opposite side of a device embodying our invention. Fig. 4 is a front elevation of the same. Figs. 5, 6 and 7 are views showing the lineal measurement scale (Fig. 6), the price totals, and scale of prices per yard, exhibited through the opening in the front of the computing drum, the illustration being taken when the drum is at rest and the views in the sequence of their numbers presenting a continuous and complete exhibit of numerals visible from the front of the machine when the machine is so at rest; the views being taken in the order of their numbers from left to right. Fig. 8 is a detail sectional view taken through the window in the housing of the computing drum, and through the periphery of the computing drum, taken along the line 8—8 of Fig. 4. Fig. 9 is a similar sectional view taken along the line 9—9 of Fig. 4. Fig. 10 is an enlarged perspective view of the longitudinal adjusting bar employed in the bolt-receptacle. Fig. 11 is a longitudinal vertical view of the same in section, showing the guide-boards in place. Fig. 12 is a bottom plan view of the exterior attachments upon the right end of the shaft carrying the computing drum. Fig. 13 is a longitudinal view in vertical mid-section, taken through the computing drum, the central portion being broken away. Fig. 14 is an enlarged detail view of the flexible connection between the computing drum and the upper friction roller, indicating the resilient parts exposed by the removal of the left head of the housing containing the computing drum. Fig. 15 is an enlarged detail view of the end of the upper friction roller, showing the anti-slipping mechanism with which it is equipped. Fig. 16 is an enlarged detail view of the frictional lock with which the right guide-board is provided. Fig. 17 is a top plan view of the wheel mounted on the right end of the shaft carrying the computing drum. Fig. 18 is a rear elevation of said wheel and its dog mechanism. Fig. 19 is an enlarged perspective view of the arc-shaped wedge whereby the computing drum is thrown out of operative connection with the upper friction roller. Fig. 20 is a top plan view of the adjustable stop whereby the computing drum is adjusted. Fig. 21 is a vertical sectional view of the same taken along the line 21—21 of Fig. 20. Fig. 22 is a plan view of the bell-crank lever 83. Fig. 23 is a similar view of the dog 135.

As shown in the drawings, we employ a frame 25 comprising the end supports 26—26 connected together by transverse rods 27, and containing the housing 28 which forms the cloth receptacle 29; the rear wall 30 of the receptacle 29 is substantially vertical while the front wall 31 is inclined upwardly and rearwardly (see Figs. 1, 2 and 3). At its top the frame 25 supports the heads 32 and 33 connected to each other by means of rods 34. Between the heads 32 and 33, which are parallel and vertical, we provide a cylindrical housing 35 provided at its front with horizontal windows 36 and 37, separated from each other by means of the vertical window 38, all of said windows being surrounded by the casing 39, provided with the vertical strips 40 for the accommodation of the vertical window 38. Within the cylindrical housing 35 the shaft 41 is mounted, its ends extending through the heads 32 and 33 and its outer extremities being provided with hand-wheels 42 and 43.

The drum 44 is mounted upon the shaft 41 by means of arms 45. About its periphery, and preferably at its middle zone, the drum 44 is provided with a lineal measurement scale 46. In the construction illustrated in the drawings (see Fig. 6), the lineal measurement scale represents 16 yards, each yard being divided into fractions as desired (see Fig. 6). In the illustrated drum, 16 yards are represented by the initial zero, that portion of the lineal measurement scale shown in Fig. 6 indicating measurement lengths of from ⅛ yard to ⅜ yard below the initial zero, and 15⅝ yards, 15⅜ yards, 15¾ yards and 15⅞ yards above the initial zero. The horizontal line 201 indicates a line drawn on, or a black wire or thread drawn across the windows 36, 37 and 38, by means of which the various numerals upon the drum 44 are to be read; it registers with the initial zero when the drum 44 is at rest. About its periphery and at each side of the lineal measurement scale 46, the drum 44 is provided with total-price scales 47 and 48 reading from left to right and indicating the total price of a given length of cloth at a given price per lineal yard. The price-scale 47 indicating price-totals on a basis of from 2 cents to 70 cents per lineal yard, (see Figs. 5 and 6) while the price-scale 48 indicates price totals on a basis of from 72½ cents to $4.00 per lineal yard (see Figs. 6 and 7). Within the windows 36 and 37 we provide stationary price scales 49 (see Figs. 5, 6, 7, and 8) ranging, in the structure illustrated in the drawings, from 2¢ to $4.00, and indicating the price per yard. As the drawings illustrate, a drum having a lineal measurement scale 46 representing 16 yards, the total amounts in alinement with the zero line indicate the total value of 16 yards of cloth at the given price per yard indicated by the cost scale 49. Thus, reading upward from the fixed cost scale 49 to the corresponding numbers upon the total-price scale 47 (see Fig. 5), we find the total price of 16 yards of cloth at 2¢ per yard indicated as 32¢; the total price of 16 yards of cloth at 37½¢. indicated as $6.00, and the total price of 16 yards at 70¢ per yard as $11.20 (see Fig. 6). The next reading from the total-price scale is had to the right of the lineal measure scale 46 (see Fig. 6), where we find the price of 16 yards at 72½¢ per yard indicated as $11.60, and reading further from the same scale (see Fig. 7), the total price of 16 yards at $3.98 per yard is given as $63.68.

The revolution of the computing drum 44 is accomplished by means of the withdrawal of the cloth from its bolt and contained in the receptacle 29, over the bracket 50 carried at the front of the frame 25. Parallel to the bracket 50 we provide two parallel friction rollers 51 and 52 journaled in the bearings 53 and 54; the rollers 51 and 52 being in fixed position, and the upper friction roller 55 being adapted to have frictional contact with the upper faces of the rollers 51 and 52 (see Figs. 2 and 3). The upper frictional roller 55 is provided with the crank 56 having a handle 57, and the roller 55 is mounted upon the shaft 58. At its left extremity the shaft 58 is provided with the bevel gear 59 (Fig. 14) intermeshing with the bevel gear 60 mounted upon the shaft 61. The shaft 61 at its upper extremity receives a flexible shaft 62, and its connecting mechanism, which is illustrated in the drawings as being at the left extremity of the shaft 58, is contained in a housing 63 carried by the lever arm 64 which is pivotally mounted upon the frame 25 at the point indicated by the numeral 65. The housing 63 is provided at its upper extremity with the opening 66 through which the flexible shaft 62 extends. The flexible shaft 62 enters the housing 35 through the opening 67 in its bottom (see Fig. 14) and extends upward to the point where it is fixed in the shaft 68 provided with the worm gear 69 and journaled in the brackets 70 and 71. The worm 69 intermeshes with the worm-wheel 72, which is loosely mounted upon the shaft 41. The outer face of the worm wheel 72 is normally in contact with the disk 73 (Fig. 13) which is fixed upon the shaft 41. Upon the inner face of the worm-wheel 72 the disk 74, slidably mounted upon the shaft 41 by means of a key 159 and registering in size with the disk 73, is normally thrust outward by means of the coil spring 75, to effect a frictional engagement with the worm-wheel 72. The disk 74 is provided with a disk 76 journaled upon the tubular collar 77 whose inner end is secured by the vertical support 78. The coil spring 75 is mounted about the collar 77, at its outer extremity, exerting pressure upon the flanged collar 79 with which the disk 76 is provided. The disk 76 is connected to the collar 79 by means of the annular web 80, thus forming the grooved depression 81 in which the yoke 82 (see Fig. 22) is loosely mounted, the yoke 82 being provided with a bell-crank lever 83 whose lower arm extends outwardly through the opening 84 (Fig. 13) in the head 32. The head 32 is provided upon its inner face with the bracket 85 upon which the bell-crank lever 83 is pivotally mounted. The lower arm of the bell-crank lever 83 is provided with a horizontal slot 86 provided at its mouth with the vertical roller 87.

The upper friction roller 55 is journaled at its right extremity in the curved support 88 Fig. 3 whose formation corresponds to that of the bracket 64; and the inner ends of the support 88 and bracket 64 are pivotally mounted at the points indicated by the numerals 65 and 90, which points of pivotal support are in the same horizontal plane. An arc-shaped tapering lever bar 91 is pivotally mounted upon the outer face of the bracket 64 as indicated by the numeral '92, its thickness tapering toward its upper terminal 93 Fig. 19; and the bar 91 passes through the horizontal slot 86 in the lower arm of the bell-crank lever 83 (see Figs. 2 and 13).

By means of the construction thus described, when the upper friction roller 55 is thrown upwardly and out of engagement with the upper surfaces of the lower friction rollers 51 and 52, the lever 91 contacting with the outer face of the head 32 and with the roller 87, thrusts the lower arm of the bell-crank lever 83 outwardly, driving the yoke 82 inwardly, releasing the worm-wheel 72 so as to permit it to revolve freely upon the shaft 41, so interrupting the connection between the upper friction roller 55 and the worm-gear 69 through the flexible shaft 62. The operative connection between the computing drum 44 and the upper friction roller 55 being thus completely interrupted, is restored by the act of lowering the upper friction roller 55 into its active position, in contact with the faces of the lower friction rollers 51 and 52.

For the expeditious shifting of position of the friction roller 55 and its connections, and to the end of locking said friction roller in either of its two positions, operative or inoperative, we have provided a lever arm 94 Fig. 2 pivotally mounted upon the head 32 by the pin 95, and terminating at its free end in the handle 96. A connecting bar 97 is pivotally connected to the bracket 64 by the pin 98 and to the lever arm 94 by the rod 99. Upon the inner face of the lever arm 94 we provide a pronged fork 100 which is pivotally mounted upon the rod 99, and is provided with an outwardly projecting handle 101 normally held away from the lever arm 94 by means of the coil spring 102. The lower engaging hooks 103 and 114 of the pronged fork 100 and 111 engage with the pin 104 when the upper friction roller 55 is in operative position. The upper hook 105 engages with the pins 106 and 117 when the upper friction roller 55 is in its elevated or inoperative position (as shown by dotted lines in Fig. 3).

The lever arm 94 is connected to a corresponding lever arm 107 Fig. 3 by the rod 99, the lever arm 107 being provided with the handle 108 and being connected to the support 88 by the bar 109, whose lower end is secured to the support 88 by means of the pin 110, its upper end being secured to the outer face of the lever arm 107 by the rod 99. The pronged fork 111 is also mounted on the lever arm 107 by means of the rod 99, and is provided with the outwardly projecting handle 112, normally held away from the lever arm 107 by means of the coil spring 113. The lower hook 114 of the pronged fork 111 engages with the pin 115 to lock the upper friction roller 55 in operative position; while the upper hook 116 of the lever arm 107 engages with the pin 117 to lock the upper friction roller 55 in its elevated or inoperative position.

In order to keep the bolt of cloth which is being measured from shifting from side to side, we have provided the guide-board 118 mounted upon the inner and up-turned end 119 of the adjusting bar 120 (see Figs. 1, 2 and 10), the adjusting bar 120 being provided at its opposite extremity with the handle 121. Within the receptacle 29 we provide a fixed guide-board 122 provided with the slot 123 through which the longitudinal adjusting bar 120 passes. Upon the outer face of the fixed guide-board 122 we provide a vertically mounted tube 124 closed at its upper end as indicated by the numeral 125 Fig. 16, and containing a coiled spring 126 whose lower end operates against the plunger 127 to thrust the same downwardly and into frictional contact with the upper face of the longitudinal adjusting bar 120. The tube 124 is provided with a slot 128 through which a pin 129 extends in the plunger 127. The pin 129 may be raised to permit the inward or outward adjustment of the longitudinal adjusting bar 120.

To prevent the retrograde movement of the computing drum 44, we have provided the means illustrated in Figs. 12, 13, 17 and 18. On the outer face of the head 33 is provided a screw plug 130 whose inner end is screwed into position in the face-plate 131 mounted upon the outer face of the head 33. The plug 130 is screw-threaded horizontally to receive the screw-top 132 which is provided with an outwardly projecting flange 133 at its outer end. The plug 130 is screw-threaded to receive the set-screw 134 by which the screw-stop 132 may be locked in position (see Figs. 20 and 21). A spring dog 135 Figs. 17 and 23 is mounted beneath the plate 136 by means of the pin 138. The outer end of the plate 136 is secured to the hand wheel 43 by means of the pin 137. The dog 135 is normally kept in position by means of the flat spring 139. Said dog 135 is also provided with a lateral projecting lug 140 (see Fig. 23), and is pivotally mounted at its outer end by the pin 138 passing through the perforation 141. The plate 136 is bent over at its end to form the bracket 142. A coiled spring 143 is mounted around the lug 140 and its opposite end is held within the bracket 142 by means of the screw 144. The projecting point 145 of the dog 135 is adapted to engage with the projection 133 of the screw 132 hereinabove described.

By means of the adjustment of the screw 132, the computing drum 44 is set so that its zero (0) line appears mid-way the height of the windows 36, 37 and 38. In order that the computing drum may automatically return to its initial position indicated in Figs.

5, 6 and 7, with the zero (0) line mid-way the height of the windows 36, 37 and 38, we have provided a counterbalancing weight 146 Fig. 13 suspended by a chain 147, the end of which chain 147 is attached to the cylindrical collar 148 by means of the pin 149. The collar 148 is slidably and revolubly mounted upon the shaft 41 and is fixed in position by means of the set-screw 150. The counterbalancing weight 146 is so suspended, by employing a chain 147 of such length, that the weight 146 will be drawn upward into contact with the collar 148 by a single revolution of the computing drum 44. Where the drum 44 is revolved more than once, the counterbalancing weight 146 will be drawn upwardly and over the collar 148 and dropped into its original position. By means of this device, the shaft 41 carrying with it the drum 44 will return to its initial position whenever the operative connection between said computing drum 44 and the upper friction roller 55 is interrupted by the elevation of the lever arms 94 and 107, as hereinbefore described.

It is obvious that the counterbalancing mechanism described in the preceding paragraph must be so constructed as to be operative within the limits of approximately one-half the diameter of the drum, owing to the limitations of space and the other operative parts of the device. To this end we prefer to use a chain 147 whose length in proportion to the circumference of the collar 148 is such that with each complete revolution of the drum 44, the weight 146 will be carried over the collar and will immediately drop to its former position with its load upon the depending end of the chain 147. By reason of this proportioning the length of the chain to the circumference of the collar 148, the entire mechanism is contained within the limits of space afforded by the interior of the drum 44, and should the drum, in the operative use of the device, accomplish more than one revolution, and no matter how many revolutions more than one are thus accomplished, the counterbalancing weight 146 is always so positioned as to restore the drum 44 to its initial or zero (0) position, when the operative connection between the drum 44 and the upper friction roller 55 is interrupted, by passing through less than one complete revolution. To insure the comparatively frictionless rotation of the drum 44, we have provided the shaft 41 with the conical collars 151 and 152. The face-plate 131 is provided with the annular recess 153 containing the ball-bearings 154. Similarly, the head 32 is provided with the face-plate 155 having the annular chamber 156 provided with ball-bearings 157.

The mode of operation of the device of our invention will be readily understood from the foregoing description. The bolt of cloth to be measured is deposited in the receptacle 29. The guide-board 118 is adjusted by means of the handle 121 on the longitudinal adjusting bar 120. The end of the cloth is drawn outwardly between the lower friction rollers 51 and 52 and the upper friction roller 55. The crank 56 is revolved by the handle 57 to draw the cloth outwardly, movement being simultaneously imparted to the computing drum 44 by means of the flexible shaft 62. The desired length of cloth having been measured, as indicated by observation through the vertical window 38, the total selling price of such length of cloth so measured is made visible by reference to the price scale 49 and upon which the price per yard will appear, while the total price of the piece of cloth measured will be found upon the scale 47, immediately above the figures indicating the price per yard The cloth being cut by means of any suitable cutting instrument, said cutting instrument being guided by the groove 158 on the shelf or bracket 50, the upper friction roller 55 is thrown upward, releasing the end of the cloth and disconnecting the mechanism actuating the drum 44, which drum 44 is then restored by reason of the counterbalancing weight 146 to its zero (0) or initial position. The bolt of cloth is then removed from the receptacle 49.

The upper friction roller 55 as illustrated in Fig. 15 is provided with means to insure its frictional engagement with the inner face of the bracket 64. At one of its extremities the upper friction roller 55 is provided with slotted recesses 159' and 160 in which pins 161 and 162 are slidably mounted. The pins 161 and 162 project from the inner face of the cylindrical drum 163 which is mounted about the shaft 58. The inner face of the drum 163 is cut away as indicated by the numeral 164 to permit the inner end of the coiled spring 165 to exert its pressure upon the end of the friction roller 55, the outer end of the coiled spring 165 being held by the inner face of the outer head 166 of the drum 163. The curved support 88 is provided with the opening 167 through which the shaft 58 passes and upon the inner face of the curved support 88 is provided a flanged disk 167' secured to the inner face of the support 88 by means of pins 168 and 169, to secure the disk against rotation. The shaft 58 is provided with the integral circular collar 170 whose outer edges are beveled as indicated by the numeral 171 to register with the inner face of the disk 167', as shown in Fig. 15. The lateral pressure exerted by the coiled spring 165 thus prevents the accidental rotation of the upper friction roller 55, and guards against the accidental slipping of said roller 55.

Having thus fully described our invention, what we claim as new and desire to have secured to us by the grant of Letters Patent, is:

1. In a cloth-measuring and price-computing machine, the combination of a frame; a receptacle adapted to receive a bolt of cloth longitudinally; two parallel lower friction rollers mounted in said frame at the mouth of said receptacle; a shaft mounted transversely in the frame; a price-computing drum mounted on said shaft; an upper friction roller pivotally mounted in the frame and arranged to contact with the upper faces of the two lower friction rollers; a crank whereby said upper friction roller is actuated; means for locking said upper friction roller in operative contact with said lower friction rollers; means for locking said upper friction roller in a position out of contact with said lower friction rollers; and a flexible operating connection between the said upper friction roller and said computing drum, said computing drum adapted to be thrown out of operation by the elevation of the upper friction roller, substantially as described.

2. In a cloth-measuring and price-computing machine, the combination of a frame; a receptacle adapted to receive a bolt of cloth longitudinally; a fixed guide-board transversely mounted in said receptacle; another guide-board adjustably and transversely mounted in said receptacle; two parallel lower friction rollers mounted in said frame at the mouth of said receptacle; a shaft mounted transversely in the frame; a price-computing drum mounted on said shaft; an upper friction roller pivotally mounted in the frame and arranged to contact with the upper faces of the two lower friction rollers; a crank whereby said upper friction roller is actuated; means for locking said upper friction roller in operative contact with said lower friction rollers; means for locking said upper friction roller in a position out of contact with said lower friction rollers; and a flexible operating connection between the said upper friction roller and said computing drum, said computing drum adapted to be thrown out of operation by the elevation of the upper friction roller, substantially as described.

3. In a cloth-measuring and price-computing machine, the combination of a frame; a receptacle adapted to receive a bolt of cloth longitudinally; two parallel lower friction rollers mounted in said frame at the mouth of said receptacle; a shaft mounted transversely in the frame; a price-computing drum mounted on said shaft; an upper friction roller pivotally mounted in the frame and arranged to contact with the upper face of the two lower friction rollers; said upper friction roller being provided with self-contained frictional means to prevent slipping; a crank whereby said upper friction roller is actuated; means for locking said upper friction roller in operative contact with said lower friction rollers; means for locking said upper friction roller in a position out of contact with said lower friction rollers; and a flexible operating connection between the said upper friction roller and said computing drum, said computing drum adapted to be thrown out of connection by the elevation of the upper friction roller, substantially as described.

4. In a cloth-measuring and price-computing machine, the combination of a frame; a receptacle adapted to receive a bolt of cloth longitudinally; guide-boards adjustably mounted in the ends of said receptacle; two parallel lower friction rollers mounted in said frame at the mouth of said receptacle; a shaft mounted transversely in the frame; a price-computing drum mounted on said shaft; an upper friction roller pivotally mounted in the frame and arranged to contact with the upper face of the two lower friction rollers; said upper friction roller being provided with self-contained frictional means to prevent slipping; a crank whereby said upper friction roller is actuated; means for locking said upper friction roller in operative contact with said lower friction rollers; means for locking said upper friction roller in a position out of contact with said lower friction rollers; and a flexible operating connection between the said upper friction roller and said computing drum, said computing drum adapted to be thrown out of operation by the elevation of the upper friction roller, substantially as described.

5. In a device of the class described, a frame; a receptacle formed in the frame; two lower horizontal and parallel friction rollers mounted in the mouth of the receptacle; an upper friction roller pivotally carried by the frame and having operative frictional contact with the upper faces of the lower rollers; a computing drum revolubly mounted in the frame; means adapted to convey rotative movement from the upper friction roller to the drum; and a clutch mechanism whereby the drum is released from operative connection with the upper friction roller when said roller is removed from contact with the lower friction rollers, substantially as described.

6. In a device of the class described, a frame; a receptacle formed in the frame; two lower horizontal and parallel friction rollers mounted in the mouth of the receptacle; an upper friction roller pivotally carried by the frame and having operative frictional contact with the upper faces of the lower rollers; a computing drum revolubly mounted in the frame; means adapted to convey rotative movement from the upper friction roller to the drum; and a clutch mechanism whereby the drum is released from operative connection with the upper friction roller when said roller is removed from contact with the lower friction rollers; and means for restoring the drum to its initial operative position when so released, substantially as described.

7. In a device of the class described, a frame; means carried by the frame for holding a bolt of cloth in revoluble position; two lower horizontal and parallel friction rollers mounted parallel with the bolt; an upper friction roller pivotally carried by the frame and having operative frictional contact with the upper faces of the lower rollers; a computing drum revolubly mounted in the frame; means adapted to convey rotative movement from the upper friction roller to the drum; and a clutch mechanism whereby the drum is released from operative connection with the upper friction roller when said roller is removed from contact with the lower friction rollers, substantially as described.

8. In a device of the class described, a frame; means carried by the frame for holding a bolt of cloth in revoluble position; two lower horizontal and parallel friction rollers mounted parallel with the bolt; an upper friction roller pivotally carried by the frame and having operative frictional contact with the upper faces of the lower rollers; a computing drum revolubly mounted in the frame; means adapted to convey rotative movement from the upper friction roller to the drum; and a clutch mechanism whereby the drum is released from operative connection with the upper friction roller when said roller is removed from contact with the lower friction rollers; and automatic means for restoring the drum to its initial operative position when so released, substantially as described.

9. In a device of the class described, a frame; a receptacle formed in the frame; two lower horizontal and parallel friction rollers mounted in the mouth of the receptacle; an upper friction roller pivotally carried by the frame and having operative frictional contact with the upper faces of the lower rollers; means for locking said upper friction roller in and out of its operative position; a computing drum revolubly mounted in the frame; means adapted to convey rotative movement from the upper friction roller to the drum; and a clutch mechanism whereby the drum is released from operative connection with the upper friction roller when said roller is removed from contact with the lower rollers, substantially as described.

10. In a device of the class described, a frame; a receptacle formed in the frame; two lower horizontal and parallel friction rollers mounted in the mouth of the receptacle; an upper friction roller pivotally carried by the frame and having operative frictional contact with the upper faces of the lower rollers; means for locking said upper friction roller in and out of its operative position; a computing drum revolubly mounted in the frame; means adapted to convey rotative movement from the upper friction roller to the drum; a clutch mechanism whereby the drum is released from operative connection with the upper friction roller when said roller is removed from contact with the lower friction rollers; and means for automatically restoring the drum to its initial operative position when so released, substantially as described.

11. In a device of the class described, a frame; means carried by the frame for holding a bolt of cloth in revoluble position; two lower horizontal and parallel friction rollers mounted in alinement with the bolt; an upper friction roller pivotally carried by the frame and having operative frictional contact with the upper faces of the lower rollers; means for locking said upper friction roller in and out of its operative position; a computing drum revolubly mounted in the frame; means adapted to convey rotative movement from the upper friction roller to the drum; and a clutch mechanism whereby the drum is released from operative connection with the upper friction roller when said roller is removed from contact with the lower friction rollers, substantially as described.

12. In a device of the class described, a frame; means carried by the frame for holding a bolt of cloth in revoluble position; two lower horizontal and parallel friction rollers mounted in alinement with the bolt; an upper friction roller pivotally carried by the frame and having operative frictional contact with the upper faces of the lower rollers; means for locking said upper friction roller in and out of its operative position; a computing drum revolubly mounted in the frame; means adapted to convey rotative movement from the upper friction roller to the drum; and a clutch mechanism whereby the drum is released from operative connection with the upper friction roller when said roller is removed from contact with the lower friction rollers; and means for automatically restoring the drum to its initial operative position when so released, substantially as described.

13. In a cloth-measuring and price-computing machine, a frame; means carried by the frame for holding a bolt of cloth in position to be unwound; a cylindrical housing carried by the frame having a longitudinal aperture; a computing drum revolubly mounted in the housing; and provided upon its periphery with scales adapted to be read through the aperture in the housing; a fixed scale of unit prices mounted in the aperture in the housing and registering with the scales on the drum; means for operating the drum by unwinding the cloth from its bolt, and means carried by the drum automatically to restore it to its initial position, substantially as described.

14. In a cloth-measuring and price-computing machine, the combination of a frame, means supported by the frame for holding a bolt of cloth in revoluble position; a price-computing drum revolubly mounted in the frame; said drum having a weight-actuated means whereby it is restored to its initial zero; and means whereby said price-computing drum is revolved by the withdrawal of the cloth from the bolt, substantially as described.

15. In a cloth-measuring and price-computing machine, the combination of a frame; means supported by the frame for holding a bolt of cloth in revoluble position; a price-computing drum revolubly mounted in the frame; said drum having means whereby it is restored to its initial zero; a cushioned and adjustable stop whereby said drum may be adjusted to fix its initial zero at the proper starting position; and means whereby said price-computing drum is revolved by the withdrawal of the cloth from the bolt, substantially as described.

In testimony whereof, we have signed our names to this specification, in presence of two subscribing witnesses.

WILLIAM F. GOESSLING.
HENRY E. PAUK.
CHARLES M. KACHEI
OTTO A. HECKEL.

Witnesses:
JAMES L. HOPKINS,
L. A. L. McINTYRE.

Copies of this patent may be obtained for five cents each, by addressing the "Commissioner of Patents, Washington, D. C."